Patented Sept. 20, 1949

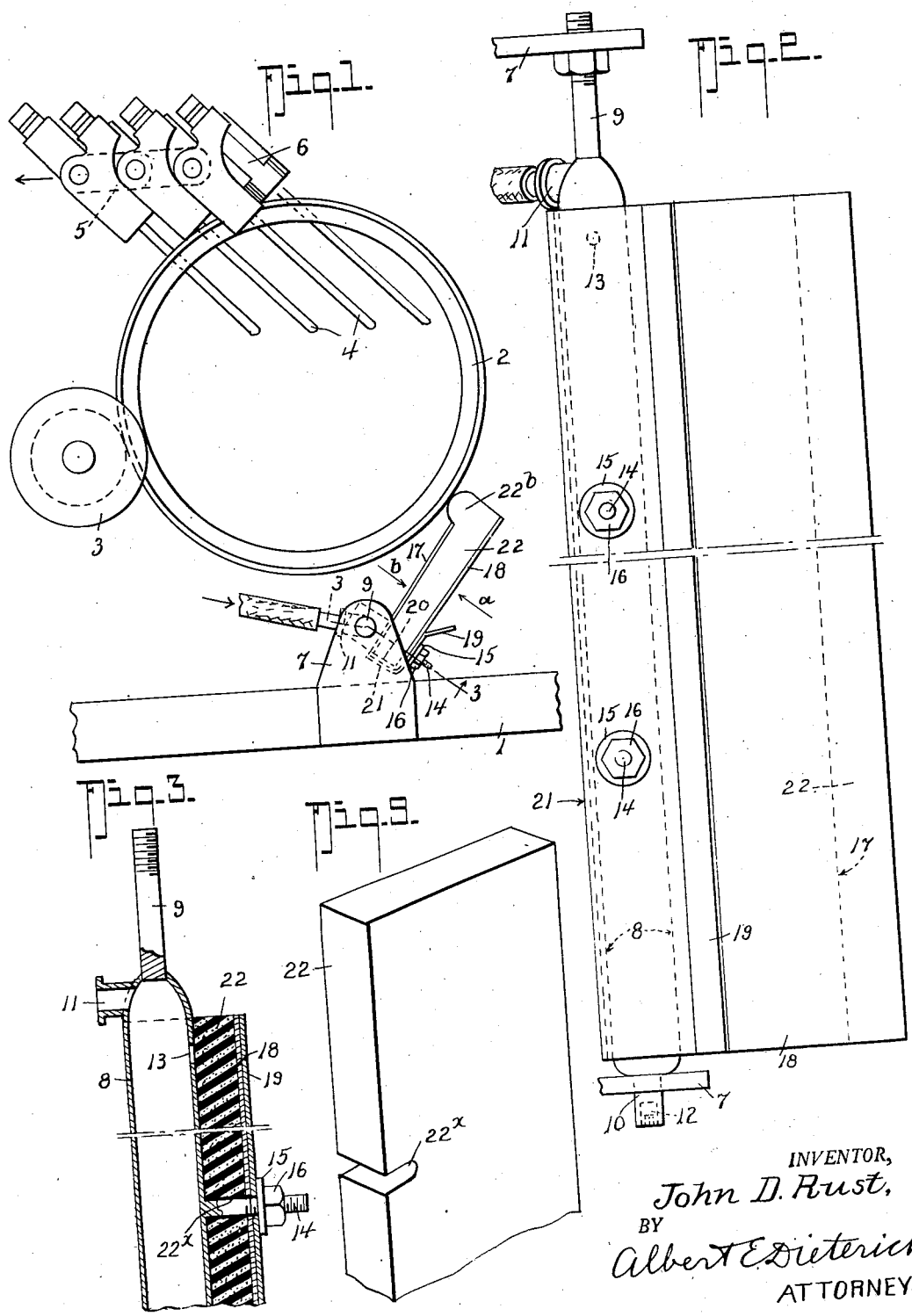

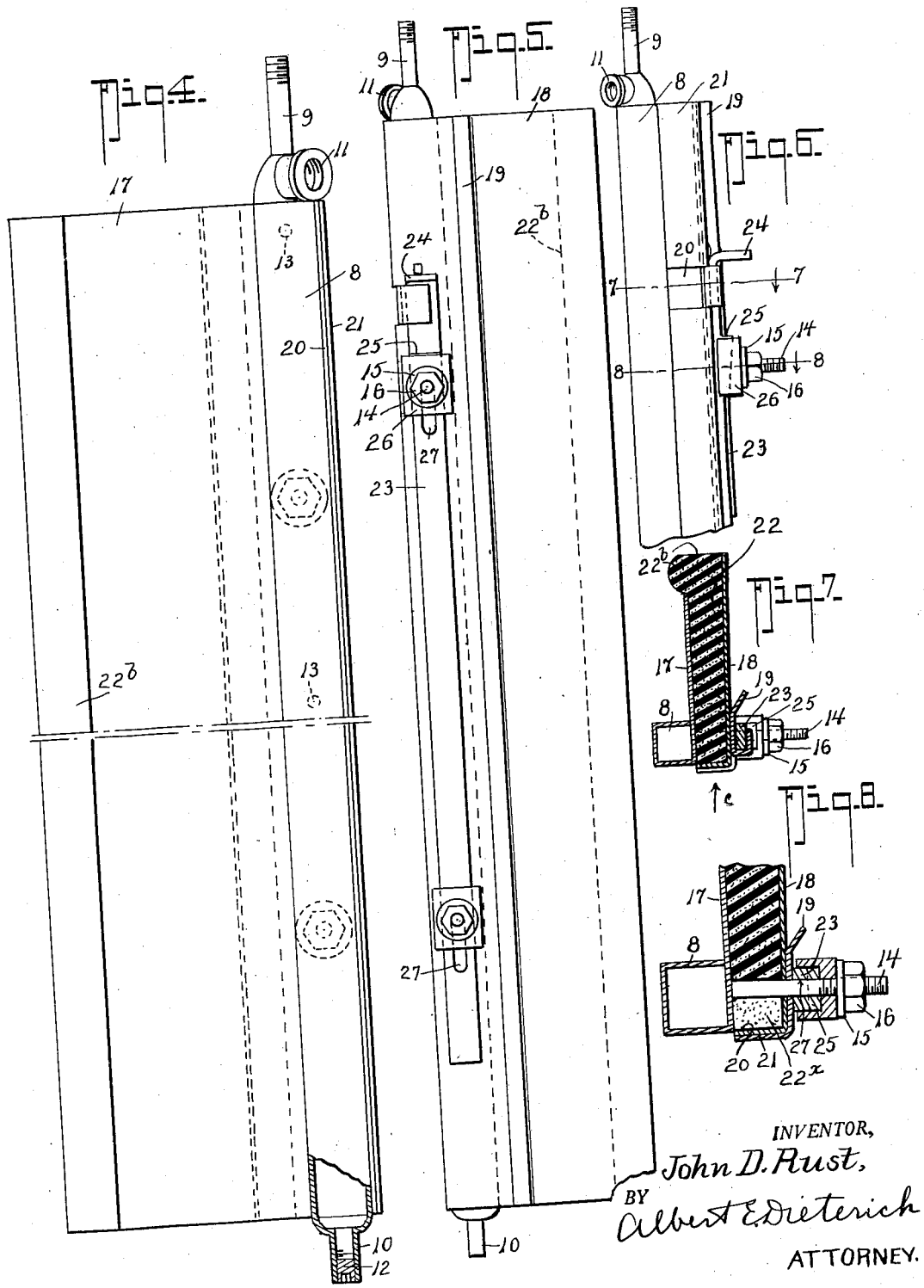

2,482,557

UNITED STATES PATENT OFFICE 2,482,557

CAPILLARITY CONTROLLED WICK

John D. Rust, Memphis, Tenn.

Application August 20, 1946, Serial No. 691,781

1 Claim. (Cl. 91—48)

The present invention in its general aspect relates to a means for variably controlling the capillarity of a fluid passing wick.

Primarily the invention has for its object to provide an improved fluid conducting wick or sponge and a holder that has provisions for controlling the fluid conductivity of the wick or sponge to permit passage of a regulated amount of fluid derived from a constant source of supply.

Another object is to provide an improved means for regulating the flow of fluid through a wick by compressing the wick to a desirable degree. My immediate application of this principle is for dampening cotton picker spindles to the proper degree. I have found through a number of years of experiments that the effectiveness of moisture on a cotton picker spindle is the greatest with the least amount of moisture that can be applied to the spindle and still leave it damp. The surplus of fluid acts temporarily as a lubricator. Consequently, smooth surfaced spindles carrying a surplus of moisture may enter the cotton plant and rotate in contact with the cotton fiber without wrapping up the fiber for the reason that the spindle is withdrawn from the plant before the cotton fiber has had time to absorb the surplus liquid sufficiently to cause it to adhere to and wrap upon the spindles. I have found that it is a most difficult job to apply enough moisture to make sure of dampening the spindles without at the same time getting a surplus of liquid on the spindles. My present invention overcomes this difficulty by the use of a wick of substantially unified texture supported in a mechanism designed to adjustably squeeze the wick uniformly between the part of the wick that receives the liquid and the part that delivers the liquid by capillary action to the spindles or to moistening rings, such as shown in my application Serial Number 618,104, filed September 24, 1945, which in turn wipe the moisture onto the spindles.

A further object is to provide an improved adjusting means which, when once set to effect a proper compression to the wick, may be quickly released to allow removal and replacement of wicks without requiring a new adjustment of the pressure applying parts.

A further object is to provide improved means for compressing the wick at an angle in order to provide greater density along the liquid receiving portion of the wick than along the liquid delivering portion of the wick. This method of compression causes the liquid to flow by capillary action toward the less dense portion of the wick which applies the liquid to the moving parts of the machine. When using an elongated vertical wick such as is specifically described in this application, there would result a considerable loss of liquid at the receiving side of the wick if the density of the receiving and applying portions of the wick were the same.

Other objects will in part be obvious and in part will be pointed out hereinafter.

To the attainment of the aforesaid objects and ends, invention further resides in those novel details of construction, combinations and arrangements of parts, all of which will first be described in detail and then be specifically pointed out in the appended claim, reference being had to the accompanying drawings in which:

Fig. 1 is a detail plan view showing my invention in use.

Fig. 2 is an enlarged elevation of the device constituting per se, my invention looking in the direction of the arrow $a$ in Fig. 1.

Fig. 3 is a detail section on the line 3—3 of Fig. 1.

Fig. 4 is an enlarged elevation of my device looking in the direction of the arrow $b$ in Fig. 1.

Fig. 5 is an elevation similar to Fig. 2 on a smaller scale and illustrating another embodiment of the invention.

Fig. 6 is a detail elevation looking in the direction of the arrow $c$ in Fig. 7.

Fig. 7 is a cross section on the line 7—7 of Fig. 6.

Fig. 8 is an enlarged detail section on the line 8—8 of Fig. 6.

Fig. 9 is a detail perspective view of a portion of the wick.

In the drawings in which like numerals and letters of reference indicate like parts in all the figures, 1 represents a part of the frame of a Rust type cotton picking machine, 2 the doffer rings, 3 the doffer-ring-supporting roller, 4 the picking spindles, 5 a part of the endless slat conveyor chain, and 6 the slats, all of which are of known construction and per se constitute no part of the present invention.

Mounted in suitable supports or brackets 7 is the device which comprises my present invention. The device comprises a tubular support 8 having an upper mounting rod 9 to engage the upper bracket 7 and a lower hollow rod 10 to engage the lower bracket 7. The rod 10 communicates with the tubular support 8 and is provided with a drain plug 12. Water from a suitable source of supply is introduced into the upper end of the support 8 through a nipple 11, The support 8 has one or more outlet holes 13 over which the wick or sponge 22 lies.

A rigid plate 17 extends laterally from the support against which plate the wick or sponge 22 is squeezed by means of an adjustable plate 18 and threaded studs 14, washers 15 and nuts 16. A reinforcing plate 19 is welded to plate 18 where the studs come through and both plates 18 and 19 have bent over portions 20, 21 respectively, to cover the inner edge of the wick.

Preferably the studs 14 do not extend normal to the plate 17 but are bent laterally slightly so that plate 18 diverges from the inner edge of the wick outwardly from plate 17 (see Figs. 1 and 7). The wick normally is of rectangular cross section as shown in Fig. 9 and is apertured or slotted, as at 22$^x$, to receive the studs 14.

In order to enable a quick change of wicks to be made I may provide a wick release device of some kind so that wicks may be removed and replaced without changing the adjustment of the nuts 16. Such a device is illustrated in Figs. 6, 7, and 8 by reference to which it will be seen that I provide a slide rod 23 having wedge elements 25 and slots 27 to pass the studs 14. The rod 23 is held in position by grooved wedges 26 slidable along the studs 14 and cooperating with the wedges 25 when the rod 23 is down. A finger piece 24 enables the rod 23 to be raised to release the wick and lowered to secure it again without changing the adjustment.

Means for the purpose can be used, other than that disclosed herein as the mechanism shown in Figs. 6 to 8, inclusively, is merely an example and not a limitation.

Further the sponge or wick 22 may be in one piece or it may be in sections if desired.

In order to lessen the flow of liquid toward the free edge 22$^b$ it is only necessary to tighten up on the nuts 16 and conversely to increase the flow it is only necessary to loosen the nuts. By tightening up more on one nut than on the other the flow may be further varied and controlled with respect to the overall length of the wick. By applying the squeeze pressure along the closer edges of the diverging plates, the flow of liquid laterally to the contact area 22$^b$ is facilitated.

From the foregoing description taken in connection with the accompanying drawings it is thought the construction, operation and advantages of the invention will be clear to those skilled in the art to which the invention appertains.

What I claim is:

A device comprising a tubular support, a fixed plate extending laterally of and secured to said support, a wick placed against said fixed plate, a movable plate placed over said wick and having a flange over one longitudinal edge of said wick, means for holding said plates and wick in assembled relation, means to admit liquid into said support, said support having means to permit the passage of liquid from said support to said wick, said holding means including studs on said support, said wick and said movable plate having stud-passing holes, a slide rod having stud-passing slots and wedges, grooved wedge-washers on said studs fitted over the wedge portions of said slide rod to cooperate with the same and adjusting nuts on said studs engaging said wedge-washers.

JOHN D. RUST.

REFERENCES CITED

The following references are of record in the file of this patent:

UNITED STATES PATENTS

| Number | Name | Date |
|---|---|---|
| 326,683 | Sparks | Sept. 22, 1885 |
| 396,402 | Hodkinson et al. | Jan. 22, 1889 |
| 2,083,042 | Storck | June 8, 1937 |
| 2,163,529 | Storck | June 20, 1939 |